United States Patent [19]
De Loze de Plaisanc

[11] Patent Number: 5,769,982
[45] Date of Patent: Jun. 23, 1998

[54] TIRE WITH REINFORCED BEADS

[75] Inventor: Pierre De Loze de Plaisanc, Clermont-Ferrand, France

[73] Assignee: Compagnie Generale des Etablissements Michelin—Michelin & Cie, Clermont-Ferrand Cedex, France

[21] Appl. No.: 678,202

[22] Filed: Jul. 12, 1996

[30] Foreign Application Priority Data

Jul. 31, 1995 [FR] France .................................. 95 09407

[51] Int. Cl.⁶ .......................... B60C 15/00; B60C 15/06; B60C 9/08
[52] U.S. Cl. .......................... 152/546; 152/542; 152/543; 152/553; 152/554; 152/560
[58] Field of Search .................................. 152/542, 546, 152/553, 554, 543, 552, 560, 539

[56] References Cited

U.S. PATENT DOCUMENTS

| | | | |
|---|---|---|---|
| 3,245,454 | 4/1966 | Lewis .................................. | 152/560 X |
| 3,638,705 | 2/1972 | Devienne et al. ...................... | 152/542 |
| 3,722,567 | 3/1973 | Delobelle ................................ | 152/553 |
| 4,244,414 | 1/1981 | Uemura et al. . | |
| 5,160,384 | 11/1992 | Ueyoko et al. ...................... | 152/546 X |
| 5,215,445 | 6/1993 | Chen . | |
| 5,285,835 | 2/1994 | Ueyoko et al. . | |
| 5,379,820 | 1/1995 | Cesar et al. .......................... | 152/552 X |
| 5,479,977 | 1/1996 | Tamano et al. . | |
| 5,522,443 | 6/1996 | Ueyoko et al. ...................... | 152/553 X |

FOREIGN PATENT DOCUMENTS

| | | |
|---|---|---|
| 657324 | 6/1965 | Belgium . |
| 0599575 | 6/1994 | European Pat. Off. . |
| 2669275 | 5/1992 | France . |

Primary Examiner—Adrienne C. Johnstone
Attorney, Agent, or Firm—Baker & Botts, L.L.P.

[57] ABSTRACT

An airplane tire, inflated to a high pressure, with radial carcass reinforcement (1), comprising at least two axially inner plies (1A, 1B, 1C) of textile cords, wound around a bead wire (3) in each bead from the inside to the outside, forming turn-ups (10A, 10B, 10C), and at least one axially outer ply (1D, 1E) of textile cords extending along the turn-ups (10A, 10B, 10C), said bead wire (3) being radially surmounted by a filler (4) of height D with respect to a reference line XX' and also comprising at least one inner flipper (5) having two legs (5I) and (5E), characterized by the fact that the end of the axially outer leg (5E) of the inner flipper (5) and the end of the turn-up (10A) of the inner carcass ply (1A) which is arranged axially furthest towards the inside are located at radial distances $L_E$ and $H_A$ from the reference line XX' which are less than D, while the ends of the inner leg (5I) and the turn-ups (10B) and (10C) of the inner carcass plies (1B) and (1C) which are axially furthest to the outside are located at radial distances from the reference line XX' which are greater than the distance D.

4 Claims, 1 Drawing Sheet

TIRE WITH REINFORCED BEADS

BACKGROUND OF THE INVENTION

The present invention relates to a tire with radial carcass reinforcement intended to support heavy loads and inflated to relatively high pressures, in particular an airplane tire.

The radial carcass reinforcements of such tires generally comprise several plies of textile cords which are anchored in each bead to at least one bead wire and generally a single bead wire. The reinforcing elements of these reinforcements are wound around said bead wire from the inside to the outside, forming turn-ups the respective ends of which are spaced radially from the axis of rotation of the tire. The severe conditions under which airplane tires are used are such that the life of the beads is short, particularly at the level of the turn-ups of the carcass reinforcement.

A substantial improvement in performance is obtained by the separating of the plies of the carcass reinforcement into two groups. The first group comprises the plies of the carcass reinforcement which are axially towards the inside in the region of the beads, these plies being then wound around a bead wire in each bead from the inside to the outside of the tire. The second group is formed of at least one axially outer ply in the region of the beads, which ply is generally wound around the bead wire from the outside to the inside of the tire.

Such arrangements are known as shown; for instance, in U.S. Pat. No. 4,244,414 (FIG. 2).

The life of beads formed in this manner can be improved by the presence in each bead of an additional reinforcement ply, wound around the bead wire and thus forming an axially outer leg and an axially inner leg, said reinforcement ply, also known as an inner flipper, being the ply closest to the rubber filler, radially above the anchoring bead wire. A fire structure of this type is shown in U.S. Pat. No. 5,285,835.

SUMMARY OF THE PRESENT INVENTION

The life of the beads of airplane tires can be further improved, particularly when they are subjected to heavy overloads which can result in a crushing of the order of 50% and more of their height, by the present invention which relates to the arrangement of the ends of the turned-up portions or turn-ups of the inner carcass plies and the ends of the legs of the inner flipper with respect to the radial position of the radially upper end of the rubber filler located above the anchoring bead wire.

In accordance with the invention, an airplane tire, inflated to a high pressure, having a tread, an crown reinforcement, and a radial carcass reinforcement comprising at least two axially inner plies of textile cords wound around a bead wire in each bead from the inside to the outside forming turn-ups and at least one axially outer ply of textile cords superimposed on the inner plies below the crown reinforcement and separated from said plies in the beads in order to extend along the turn-ups in said beads, said bead wire being radially surmounted by a filler of vulcanized rubber mix, having the shape substantially of a triangle, the apex of which radially furthest from the axis of rotation is at a distance D from a straight line parallel to said axis, passing through the geometrical center of the circle circumscribed on the cross section of the anchoring bead wire, known as the reference line, and also comprising at least one inner flipper wound around the bead wire to form an axially inner leg and an axially outer leg which are axially adjacent to the filler above the bead wire, characterized by the fact that the end of the axially outer leg of the inner flipper is located at a radial distance $L_E$ from the reference line such that $L_E$ is between 0.40 D and 0.80 D;

the end of the turn-up of the inner carcass ply arranged axially furthest to the inside is located at a distance $H_A$ from the reference line such that $H_A$ is between 0.15 D and 0.50 D, and by the fact that the ends respectively of the inner leg of the inner flipper and of the turn-ups of the inner carcass plies axially furthest from the outside are located at radial distances from the reference line greater than the distance D.

The end of the inner leg of the inner flipper is preferably further from the reference line than the end or ends of the turn-up or turn-ups of the inner carcass ply or plies which are axially furthest to the outside.

Furthermore, it is advantageous that the ends of the inner flipper and of the inner carcass plies respectively are staggered radially, that is to say each reinforcement ply end is located at a radial distance from the reference line which is different from the radial distances of the other plies.

The tire bead will advantageously be supplemented by the presence of an additional reinforcement ply of textile cords or outer chafer, located around the bead wire axially and radially furthest to the outside, and the end of the axially outer leg which is located at a distance from the line XX' less than or equal to±0.15 D.

The invention will be better understood from the following description, read with reference to the accompanying drawing, which is given by way of illustration and not of limitation.

DESCRIPTION OF PREFERRED EMBODIMENTS

Figure 1:
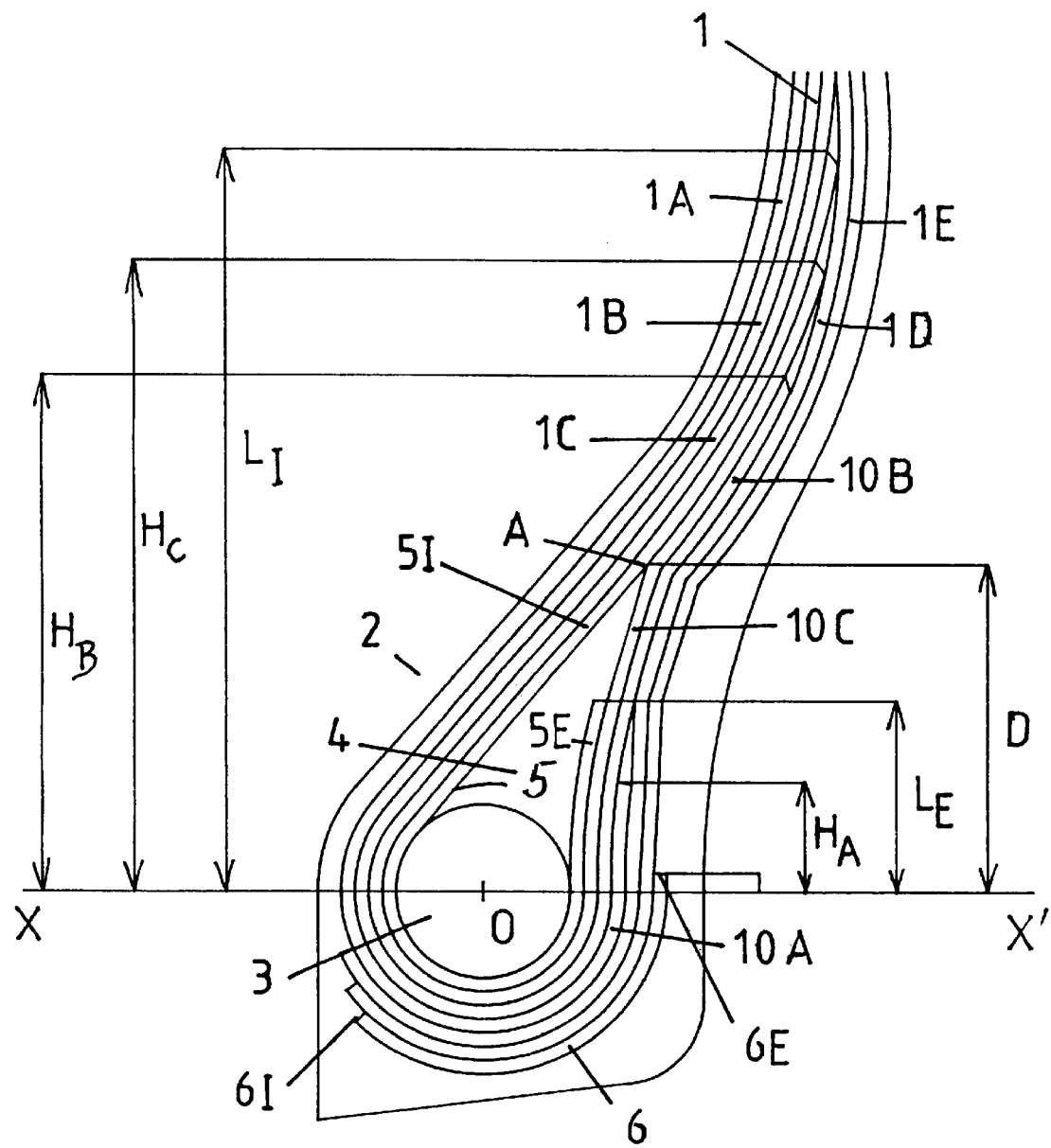
FIG. 1 is a diagrammatic view in cross section of a tire bead in accordance with the invention.

The example described is that of a tire of standard size 36×11.0 R 18 (standards of the Tire and Rim Association). The carcass reinforcement 1 is formed of five plies 1A to 1E of radial textile cords. Radial cords, as the term is used herein, are cords which form with the circumferential direction of the tire angles which may be within the range of 90°±10°. Among these five plies, three axially inner plies 1A, 1B, 1C are wound in each bead 2 around a bead wire 3, shown in the drawing as having a circular cross section, extending from the inside to the outside of the tire P in order to form turn-ups 10A, 10B, 10C.

The cross section of the bead wire 3 is surmounted radially towards the outside by a strip or filler 4 of elastomeric mix having substantially the shape of a triangle, the apex A of which, radially furthest from the axis of rotation of the tire, is located at a distance D from a reference line XX'. The reference line is parallel to the axis of rotation and through the geometrical center O of the circle circumscribed on the cross section of the bead wire 3, which circle, in the case described, is identical with the cross section itself.

The turn-up 10A of the inner carcass ply 1A axially furthest towards the inside has its end spaced radially from the line XX' by the amount $H_A$, which is equal, in the case studied, to 12 mm, namely 0.33 times the distance D, equal to 36 mm. As to the ends of the inner plies 10B and 10C, respectively, they are located radially above the apex A of the filler 4 at distances $H_B$ and $H_C$ of 55 mm and 68 mm, respectively.

The same is true of the radial end of the axially inner leg 5I of a flipper 5, which can be formed of radial textile cords identical to the carcass ply cords (but which may also be different), which end is located at a radial distance $L_I$ of 80 mm from the line XX', a distance greater than the distances $H_B$ and $H_C$ referred to above, the three ends thus arranged radially above the apex A being staggered between said apex and the point of the sidewall where the tire has a maximum axial width. As to the radial end of the axially outer leg 5E of the inner flipper 5, it is spaced from the line XX' by the radial distance $L_E$ equal to 21 mm, and, in the case of the tire size in question, equal to 0.58 D and greater than the distance $H_A$.

The two carcass plies 1D and 1E, herein called outer plies, cover the turn-ups 10A, 10B, 10C of the inner carcass plies 1A to 1C axially on the outside. The plies 1D and 1E are wound around the bead wire 3 over a portion or circular arc corresponding to an angle at the center of the circle circumscribed on the bead wire 3 equal to at most 180°, so that the ends of these plies 1D and 1E are situated radially below the reference line XX'.

The tire bead 2 is supplemented by a reinforcement ply 6 or outer chafer of radial textile cords, said ply permitting a better distribution of the pressures between the tire and its service rim, as well as assuring protection of the carcass plies against injury upon mounting.

The axially outer end 6E of said chafer is slightly above (about 2 mm) the reference line XX', while its axially inner end 6I is below said line.

A tire of this structure has been tested on a dynamometric flywheel under punishing conditions for beads of this type, these conditions corresponding to a simulation of travel on a runway (10160 kg, 4572 m, 46 km/hr), followed by a take-off from 0 to 300 km/hr, the pressure conditions being such that the crushing of the tire under the load of 10160 kg is 52%±2% of its height.

Comparison with a tire of the same size comprising the same number of carcass plies and inner and outer flipper and chafer, the inner carcass ply furthest to the inside having a turn-up the end of which is located above the apex A, and the outer leg of the inner flipper having its end below said apex, clearly and unexpectedly shows the improvement, in the life of the beads, since the tires of the invention, under the above conditions, have completed on the average 35% more runway-take-off cycles.

I claim:

1. An airplane tire, inflated to elevated pressure, having a tread, a crown reinforcement, and a radial carcass reinforcement, comprising at least two axially inner plies of textile cords, wound around a bead wire in each bead from the inside to the outside, forming outside turn-ups and at least one axially outer ply of textile cords superimposed on the inner plies under the crown reinforcement and separated from said plies in the beads in order to extend along the turn-ups of the inner plies, said bead wire being radially surmounted by a filler of vulcanized rubber mix, of substantially triangular shape, the apex A of which radially furthest from the axis of rotation is at distance D from a straight reference line XX' parallel to said axis and passing through the geometrical center of the circle circumscribed on the cross section of the anchoring bead wire, and comprising also at least one inner flipper wound around the bead wire to form an axially inner leg and an axially outer leg which are axially adjacent to the filler above the bead wire, the tire characterized by the fact that the end of the axially outer leg of the inner flipper is located at a radial distance $L_E$ from the reference line XX' such that $L_E$ is between 0.40 D and 0.80 D;

the end of the turn-up of the inner carcass ply arranged axially furthest to the inside is located at a distance $H_A$ from the reference line XX', such that $H_A$ is between 0.15 D and 0.50 D, and by the fact that the ends of the axially inner leg of the inner flipper and of the turn-up or turn-ups of the inner carcass ply or plies axially furthest to the outside are located at respective radial distances from the reference line XX' which are greater than the distance D.

2. A tire according to claim 1, characterized by the fact that the end of the axially inner leg of the inner flipper is further from the reference line XX' than the end or ends of the turn-up or turn-ups of the inner carcass ply or plies axially furthest to the outside.

3. A tire according to claim 1, characterized by the fact that the ends of the axially inner flipper and of the turn-ups of the axially inner carcass plies are radially staggered.

4. A tire according to claim 1, characterized by the fact that each bead is supplemented by the presence of an additional reinforcement ply of textile cords or outer chafer, located around the bead wire axially and radially furthest to the outside and the end of the axially inner leg of which is located at a distance from the line XX' which is less than or equal to±0.15 D.

* * * * *